April 4, 1939.   F. C. BEST   2,153,233
MOTOR VEHICLE
Filed March 16, 1933   2 Sheets-Sheet 1
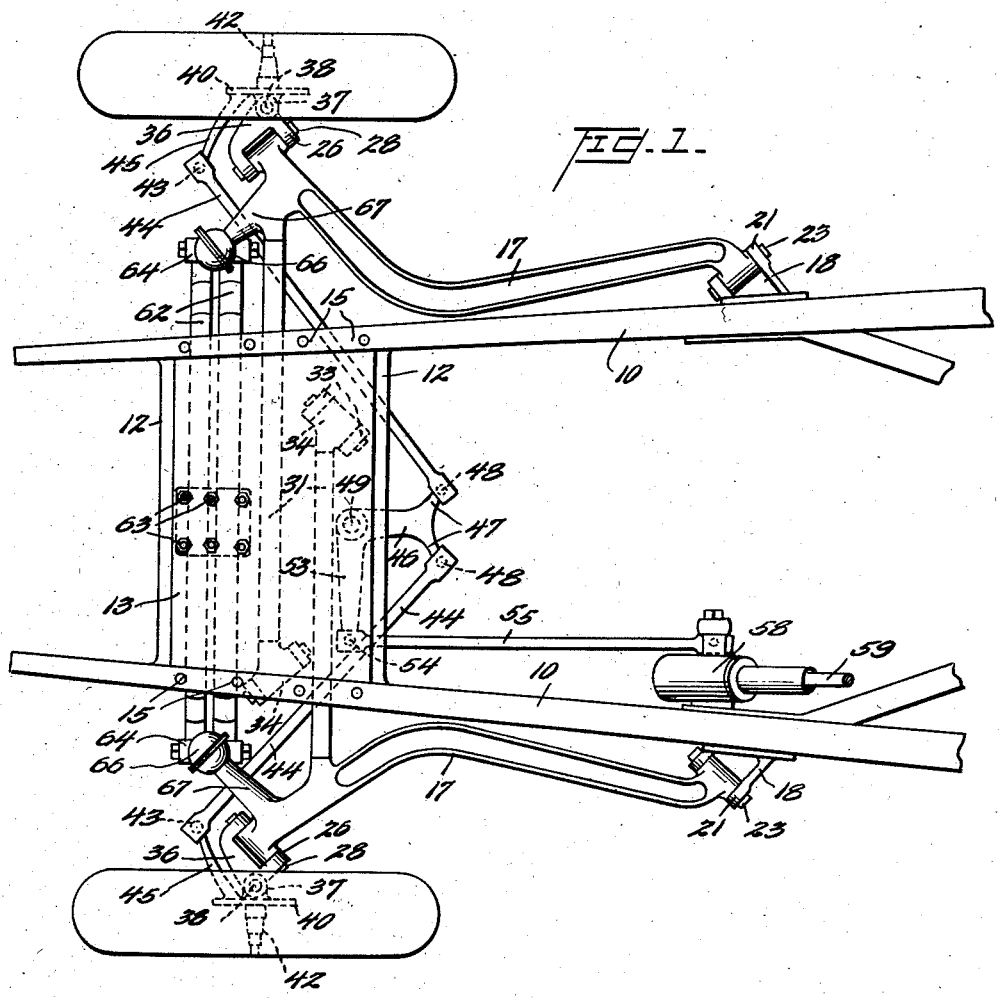
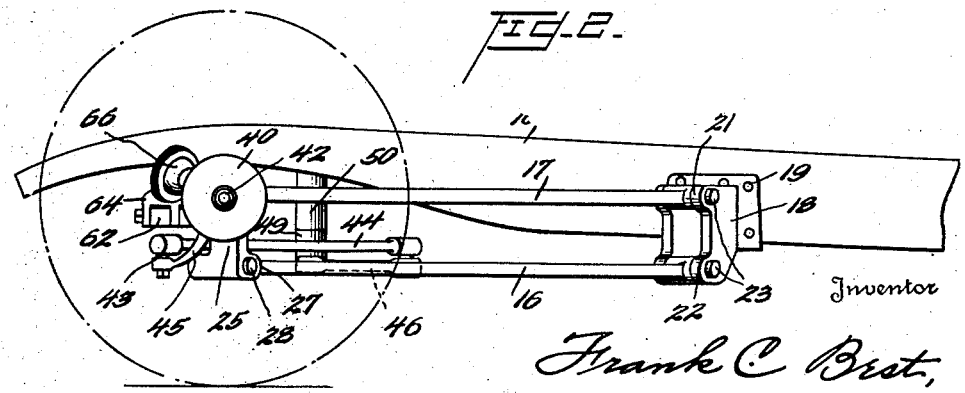
Inventor
Frank C. Best,
By Watson, Coit, Moore & Grindle
Attorney April 4, 1939.　　　F. C. BEST　　　2,153,233
MOTOR VEHICLE
Filed March 16, 1933　　2 Sheets-Sheet 2
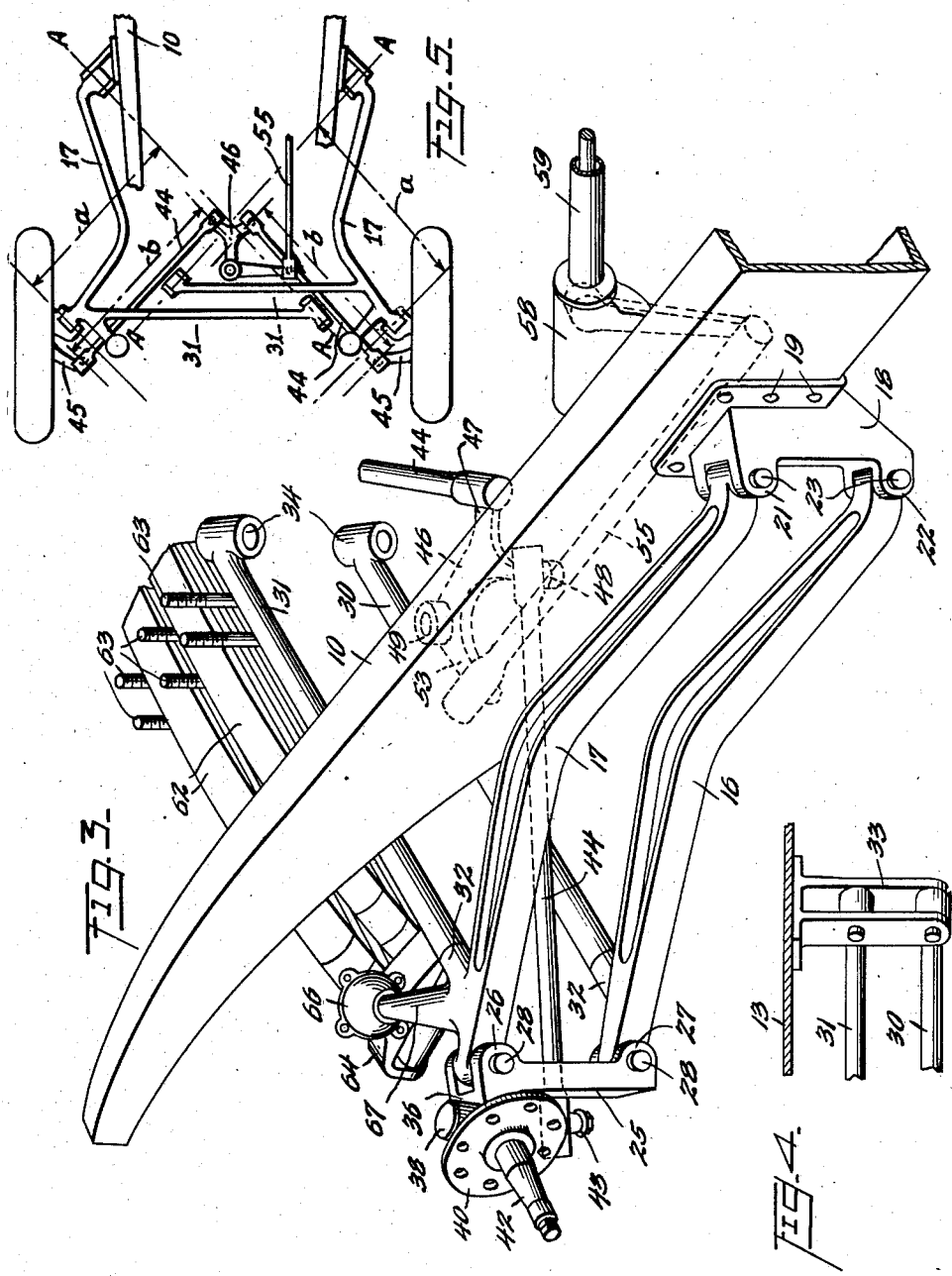

· Patented Apr. 4, 1939

2,153,233

UNITED STATES PATENT OFFICE 2,153,233

MOTOR VEHICLE

Frank C. Best, Detroit, Mich., assignor, by mesne assignments, to Robert C. Watson and Jennings Bailey, Jr., trustees, both of Washington, D. C.

Application March 16, 1933, Serial No. 661,124

10 Claims. (Cl. 280—95)

This invention relates to motor vehicle suspension and steering mechanism and more particularly to motor vehicles in which the steerable road wheels of the vehicle are independently sprung.

It is the principal object of the invention to provide means for supporting each steerable road wheel in such a manner that the wheels may rise and fall in a substantially vertical plane, the construction being such that the usual caster angle remains unchanged regardless of the extent of relative vertical movement of the wheel and frame. It is a feature of the invention that the mechanism which serves to swing the road wheels for steering is so designed that vertical movement of the wheel causes no such relative displacement of the component parts of the steering mechanism as would affect precise steering control; in other words, the construction is such that perfect steering relationship is maintained at all times It is a further object of the invention to provide independent springing for the steerable road wheels, and steering mechanism adapted to control the wheels independently, for the purpose of increasing the factor of safety.

A more specific object of the invention is the provision of independently sprung steering knuckles for the road wheels and parallel motion devices for supporting these knuckles on the vehicle frame, whereby on relative vertical movement of either wheel and the frame the steering knuckle will be moved through a series of parallel positions.

Further objects and features of the invention will be apparent from the following description taken in connection with the accompanying drawings, in which Figure 1 is a plan view of a portion of a motor vehicle chassis illustrating one method of applying the present invention;

Figure 2 is a side elevational view corresponding to Figure 1;

Figure 3 is a view in perspective of the wheel supporting mechanism and steering apparatus associated with one of the steerable road wheels;

Figure 4 is a fragmentary sectional view illustrating a supporting element; and

Figure 5 is a diagrammatic view in plan of the structure shown in Figure 3.

The preferred embodiment of the invention illustrated in the drawings is described herein in detail in order to facilitate an understanding of the principles of the invention. It will nevertheless be appreciated that no limitation is intended by the use of specific language and that such alterations and further modifications are contemplated as fall within the scope of the invention.

Referring to the drawings, it will be observed that the vehicle frame is shown as comprising the side frame members 10 and cross frame members 12, the latter serving to connect the side frame members rigidly together and also serving as a support for a plate 13, the latter being secured to the cross frame members in any convenient manner, for instance by riveting, and also being preferably secured to the side frame members as indicated at 15. This plate may be conveniently used as a support for several elements of the wheel suspension and steering mechanism as hereinafter described.

In describing the wheel suspension it will be convenient to refer first to the arrangement at the left hand side of the vehicle, the suspension for both steerable road wheels being preferably similar and the same reference characters being employed where the parts are identical.

A pair of links 16 and 17, which may be referred to as radius arms, are pivotally connected to the vehicle frame for movement about parallel and substantially horizontal axes. For instance, a supporting bracket 18 may be riveted or otherwise secured to the side frame member 10 as indicated at 19, this bracket having a laterally extending portion provided with integrally formed upper and lower forked portions 21 and 22 in which the radius arms 17 and 16 respectively are received, bolts 23 extending through these forked portions and through the radius arms serving as a fulcrum for the latter.

At their outer ends the radius arms may be similarly provided with a pivotal connection to a steering knuckle supporting member 25, the latter being provided with forked portions 26 and 27 to receive the radius arms, bolts 28 being employed to provide the necessary fulcrum. The axes of the bolts 28 are substantially parallel to the axes of the bolts 23 and it is quite clear that the knuckle supporting member 25 may be moved in a substantially vertical plane and will pass through a plurality of parallel positions; in other words, the knuckle supporting member 25 is supported by a parallel motion device so that its angular position with respect to the vehicle frame remains unchanged regardless of the extent of vertical movement of which it partakes.

The radium arms 16 and 17 are in effect parallel and are so shown in the drawings, although it is quite obvious that they need not be of the same configuration or strictly parallel throughout their length, it being intended, however, to employ the term "parallel links" to cover any pair of links in which the pivotal extremities are arranged substantially as shown in the drawings. Thus when these links are described as being of equal length, which is preferably the case, it is understood that the lengths of the links as measured between the pivotal extremities thereof are equal.

In order to relieve the lateral strain on the pivotal connections between the radius arms 16 and 17 and the vehicle frame, additional links 30 and 31 are preferably provided, these links being referred to for convenience as radius rods. Each of the radius rods is rigidly connected with a respective radius arm, for instance the arms 16 and 17 may be formed to provide laterally projecting sockets 32 in which the outer ends of the radius rods are received and secured. The inner ends of the radius rods 30 and 31 are pivotally connected to the frame, the pivotal axis of the radius rod 30 coinciding with the axis of pivotal connection of the radius arm 16 to the frame and the pivotal axis of the radius arm 31 coinciding with the pivotal axis of the radius arm 17.

The plate 13 preferably comprises the support for the radius rods 30 and 31, a bracket 33 being secured to the underside of the plate and depending to afford bearings in which the bosses 34 formed on the inner ends of the radius rods are pivotally supported in the conventional manner. It will be observed that in effect the radius rods 30 and 31 are of a length which is measured between the axes of the bolts 28 and the axes of the bosses 34 and that these rods function in the same manner as the radius arms 16 and 17 in supporting the member 25 for movement in a substantially vertical plane. With reference to the effective length of the radius rods and the radius arms, it will be appreciated that this must be measured by the length of a perpendicular line from the axes of the bolts 28 to the corresponding axes of the pivotal points of connection of the radius rods and radius arms to the frame. Thus in speaking of the effective length of these members it is intended that the term shall apply to the radius of the arc through which the knuckle supporting member 25 is swung with respect to the frame.

The steering knuckle supporting member 25 is provided adjacent its upper end with a laterally extending portion 36 on which the steering knuckle 37 is pivotally mounted for swinging movement in a substantially horizontal plane for vehicle steering purposes. This pivotal connection may assume various form, for instance the usual king pin 38 passing through the supporting member 25 and the steering knuckle 37 may be provided to serve as a fulcrum for the latter, it being understood that the pin 38 may be inclined to the vertical to provide the usual caster effect. Formed integrally with or rigidly secured to the knuckle 37 is a disk 40 to which the usual brake backing plate, not shown, may be secured, a wheel spindle 42 projecting from the face of the disk 40 and affording a support for the road wheel which is rotatably mounted thereon in the conventional manner.

The lower portion of the knuckle is provided with a steering arm 45 having a pivotal connection as indicated at 43 with a steering rod 44, and a bell crank lever 46 is provided with an arm 47 having a pivotal connection as indicated at 48 with the opposite end of the steering rod 44. The bell crank lever is provided with a bearing boss 49 by which it may be pivotally mounted on a bracket 50 secured to the underside of the plate 13 and depending therefrom, the lever 46 being oscillatable in a substantially horizontal plane.

It is important to note that if the effective length of the steering rod 44 as measured by the perpendicular distance between lines parallel to the pivotal axes of the wheel supporting arms and passing through the points 43 and 48 of pivotal connection of the rod to the steering arm 45 and the bell crank lever 46 respectively is equal to the effective length of the radius arms and the radius rods as defined hereinbefore, and if the steering rod is supported in a plane which is substantially parallel to the planes containing the pivotal axes of each of the radius arms and radius rods as shown in the drawings, there will be tendency to displace the radius rod in any direction as the steering knuckle is swung in a vertical plane since the radius rod is in effect a part of the system of parallelograms which is employed to support the steering knuckle. Thus perfect steering is secured and there is no tendency for the wheels to partake of swinging steering movement or for the parts of the steering mechanism to bind as the road wheel moves up and down in passing over an irregular road bed, it being commonly recognized that steering perfection is obtained only approximately with conventional steering mechanism and spring suspension.

The bell crank lever 46 is provided with a lever arm 53 which is pivotally connected as at 54 to a drag link 55 the latter being in turn connected in conventional manner with gearing within the housing 58, the latter being located at the lower end of the steering column 59 and carrying at its upper end the usual steering hand wheel for manipulating the gearing and associated linkage.

The construction at the right hand side of the vehicle is identical with that at the left hand side with the exception that the right hand radius rods 30 and 31, of which the latter is shown in Figure 1 of the drawings, are displaced forwardly of the radius rods employed in connection with the road wheel at the left side of the vehicle. It will be observed, however, that since the axes of swinging movement of the arms 17 intersect at the center line of the vehicle and the axes of each link 17 and the associated rod 31 are coincident, the effective lengths of the parallel links supporting the two road wheels are equal. It is important to note that if the steering connections for one wheel including the steering rod 44 are broken, the vehicle can still be steered by reason of the independent steering rod associated with the opposite road wheel.

The vertical movement of the road wheels on meeting obstructions may be resisted by means of one or more transversely extending leaf spring assemblies 62, two of these assemblies being shown in the drawings. These springs are secured intermediate their ends to the plate 13, for instance by bolts 63 and are provided adjacent their opposite outer ends with shackles 64 which are in turn pivotally connected by means of universal joints 66 to arms 67 which are preferably formed integrally with but may be rigidly secured to the radius arms 17. It will be seen that this construction results in the application of no force to the leaf springs other than that which causes them to flex in a substantially vertical plane and thus the life of the springs is prolonged. It is also important to note that the springs are not used to tie different parts of the chassis together as in conventional construction, but function solely to yieldably support the vertically movable road wheels.

In Figure 5 the arrangement of the wheel supporting links and the steering mechanism is illustrated, a considerable portion of the frame and other details being omitted. It will be observed that the axis about which each link 17 rises and falls with the road wheel is indicated at A—A, and the effective length of each of these links is represented at $a$. The effective length of each of the steering links 44, indicated at $b$ is the same as that of the links 17.

It will be observed that in the preferred form of the invention illustrated in the drawings, the axes of pivotal connection of the links to the frame and the wheel are inclined with respect to a vertical plane containing the longitudinal axis of the vehicle. While this arrangement of the axes is not essential, it facilitates the application of steering mechanism to the wheels, and furthermore, since the axes are inclined in such manner as to converge toward the front end of the vehicle, the wheels may yield to some extent on meeting an obstruction. Thus when an obstruction is encountered by either wheel, it not only rises, but moves rearwardly to a slight extent and is thus enabled to more readily surmount the obstruction and pass over it.

It will also be observed that since each of the links 16 and 17 is pivoted to the frame and to the wheel at points relatively displaced longitudinally of the vehicle, the rearward thrust on the wheels is transferred more directly by these links to the frame, being applied nearly perpendicularly at the axes of the bearings, the inclination of these axes with respect to the longitudinal axis of the vehicle being of assistance in obtaining the desired result.

The construction is characterized by extremely low unsprung weight which adds to easy riding qualities and increases the life of the tires and their adhesion to the road. The invention further serves to eliminate the undesirable features commonly referred to as shimmy and tramping owing to the fact that the wheels rise and fall in a substantially vertical plane and that synchronized movement of the wheels does not occur. On application of the brakes the operation of the springs is not affected, there being no tendency to wind the springs up in response to braking torque and thus fore and aft movement of the vehicle on application of the brakes is substantially eliminated.

It will also be noted that the spring resistance is carried to a point adjacent the loading plane of the wheel with the result that side sway ordinarily developed when the vehicle is turned sharply at high speed is materially reduced.

Having thus described the invention, what is claimed as new and desired to be secured by Letters Patent is:

1. In a motor vehicle, the combination with a vehicle frame, of a steerable road wheel, a steering knuckle carrying said road wheel, a steering knuckle supporting member, and a pair of parallel links associated with said frame and said member to permit vertical movement of the latter, each link having a pivotal connection with said member and pivotal connections with said frame parallel to said first named pivotal connection at spaced points on a common axis, whereby said knuckle may move into different parallel positions with respect to said frame, and yielding means for resisting such movement, said frame comprising side frame members, and a cross frame member connecting said side frame members and comprising a support for said links and said yielding means at points spaced from and intermediate said side frame members.

2. In a motor vehicle, the combination with a vehicle frame, of a pair of road wheels disposed adjacent one end of the frame at opposite sides thereof, and means supporting each of said wheels on said frame for rising and falling movement with respect to said frame independently of the other wheel, said means comprising a pair of generally laterally extending wheel supporting links, the links of each pair being pivotally connected with the associated wheel and being pivotally mounted at their inner ends on said frame for swinging movement about separate parallel axes, the point of pivotal connection of at least one link of each pair with the frame being displaced, longitudinally of the vehicle with respect to the point of pivotal connection with the frame of the corresponding link of the other pair, the axes of one of the links of each pair being disposed above the axes of the other link of the pair, said axes being inclined at an acute angle with respect to the vertical plane containing the longitudinal axis of the vehicle.

3. In a motor vehicle, the combination with a vehicle frame, of steerable road wheels disposed adjacent one end of the frame at opposite sides thereof, and means supporting each of said wheels on said frame for rising and falling movement with respect to said frame independently of the other wheel, said means comprising laterally extending upper and lower wheel supporting links associated with each wheel and pivotally connected with said wheels and with said frame and extending across the longitudinal center line of the vehicle, the corresponding upper and lower links associated with the opposite wheels lying in a common substantially horizontal plane and being relatively displaced longitudinally of the frame.

4. In a motor vehicle, the combination with a vehicle frame, of a steerable road wheel, a steering knuckle carrying said road wheel, a steering knuckle supporting member, and a pair of parallel links associated with said frame and said member to permit vertical movement of the latter, each link having a pivotal connection with said member and pivotal connections with said frame parallel to said first named pivotal connection, whereby said knuckle may move into different parallel positions with respect to said frame, and yielding means for resisting such movement, said frame comprising side frame members, and a cross frame member connecting said side frame members and comprising a support for said links and said yielding means at points spaced from and intermediate said side frame members.

5. In a vehicle, a frame embodying a pair of side members and a front cross member, a pair of front wheels, spring means for connecting said wheels to said frame, and, on either side of the vehicle, two respective links means, each embodying a substantially V-shaped lower link whose limbs are respectively pivoted at a first point situated on said cross member and at a second point situated on the corresponding side member, at a greater distance from the longitudinal axis of the vehicle than said first point, the pivotal axes of said limbs being substantially aligned, and whose apex is pivoted to the corresponding front wheel, and an upper link pivotally connected with the corresponding side member and to the corresponding front wheel, the pivotal axes of said apex and of said last named link being parallel with said first mentioned axes.

6. In a motor vehicle, a frame, wheels arranged at opposite sides of said frame, an individual axle for each wheel, resilient means connecting each axle to said frame, distance members each connected at one end to one of said axles, bearing members arranged at the other ends of said distance members, and bearing members arranged at the ends of said axles for pivotally connecting said axles to said frame for oscillation about axes arranged at an angle with respect to the longitudinal axis of said frame, each axle having the bearing member at one end thereof and the bearing member at one end of the distance member connected thereto arranged on opposite sides of the central longitudinal axis of said frame.

7. In a suspension for a steerable ground wheel of a motor vehicle having a frame structure, means for mounting said frame structure on said wheel for vertical displacement of said wheel independently of the remaining ground wheels of the vehicle and including a spindle rotatably journalling said wheel, a king pin providing a steering swivel for said wheel, said mounting means further including a substantially V-shaped link adapted to guide vertical displacement of said king pin, the arms of said link having axially aligned pivotal bearings, and means for pivotally supporting said link arm bearings for swinging movement of said link about an axis inclined with respect to the longitudinal and transverse vertical mid-planes of the vehicle, said link arm bearings being located on opposite sides of said longitudinal vertical mid-plane.

8. In a motor vehicle, the combination with a vehicle frame structure, of a pair of steerable road wheels disposed at opposite sides of and adjacent the forward end of said frame structure, means associated with each of said wheels and said frame structure for supporting and guiding said wheels for independent rising and falling movement, each of said wheel supporting and guiding means including at least one link having arms diverging from a wheel for pivotal connection to said frame structure, means providing a pivotal connection between the ends of said diverging arms of each of said links and said frame structure whereby each of said links swings about an axis inclined at an acute angle with respect to the longitudinal vertical midplane of the vehicle, the diverging ends of the arms of one of said links lying on opposite sides of a vertical plane containing said axis of the other of said links, steering knuckles for said wheels, tie rod means articulated to said knuckles, and steering motion imparting means operably connected to said tie rod means and positioned in the spaces provided by the diverging arms of said links.

9. A unitary wheel supporting link and torque arm structure for vehicle suspensions of the independent type, generally L-shaped in plan, having pivot bearing means at the extremities of the legs for association with a vehicle frame, and a pivot bearing means adjacent the juncture of the legs.

10. In a motor vehicle, the combination with a vehicle frame, of a steerable road wheel, a steering knuckle carrying said road wheel, a steering knuckle supporting member, and a link associated with said frame and said member to support the latter for vertical movement with respect to the frame, said link being pivotally connected with said member and having divergent arms pivotally connected to said frame at spaced points, one of said arms extending generally longitudinally of the vehicle frame and being deflected inwardly from a straight line connecting said spaced points, whereby said road wheel may move through a greater arc in steering without engaging such longitudinal arm.

FRANK C. BEST.